United States Patent
Teissier et al.

[11] Patent Number: 6,137,701
[45] Date of Patent: Oct. 24, 2000

[54] HIGH AND LOW VOLTAGE D. C. POWER SUPPLY

[75] Inventors: Maxime Teissier, Cambridge, Mass.;
Jean-Marie Bourgeois, Divonne-les-Bains, France;
Jean-Michel Ravon, Fuveau, France;
Michel Bardouillet, Rousset, France

[73] Assignee: STMicroelectronics S.A., Gentilly, France

[21] Appl. No.: 09/444,592

[22] Filed: Nov. 22, 1999

[30] Foreign Application Priority Data

Nov. 24, 1998 [FR] France ................... 98 14918

[51] Int. Cl.[7] .................. H02M 3/335; H02M 5/42; H02M 7/04
[52] U.S. Cl. .................................. 363/89; 363/19
[58] Field of Search ................. 363/18, 19, 53, 363/84, 89

[56] References Cited

U.S. PATENT DOCUMENTS

| | | |
|---|---|---|
| 4,652,984 | 3/1987 | van der akker et al. .......... 363/18 |
| 4,965,506 | 10/1990 | Algra et al. .................. 363/19 |
| 5,479,330 | 12/1995 | Bergk ........................ 363/19 |
| 5,798,914 | 8/1998 | Wuidart et al. ............... 363/44 |
| 5,847,940 | 12/1998 | Heeringa ..................... 363/18 |
| 5,852,549 | 12/1998 | Heeringa ..................... 363/18 |

FOREIGN PATENT DOCUMENTS 40 28 348  3/1992  Germany ............ H02M 3/10

OTHER PUBLICATIONS

French Search Report from French Patent Application 98 14918, filed Nov. 24, 1998.

*Primary Examiner*—Shawn Riley
*Assistant Examiner*—Bao Q. Vu
*Attorney, Agent, or Firm*—Wolf, Greenfield & Sacks, P.C.; James H. Morris; Theodore E. Galanthay

[57] ABSTRACT

A circuit for providing a D.C. voltage of high value from the output of a rectifying bridge on a capacitor of high capacitance, and for providing low supply voltages, including a first diode connected between the output of the rectifying bridge and the capacitor, first and second cascode-mounted transistors, circuitry for setting the potential of the control terminal of the first transistor, circuitry for reducing the potential of this control terminal when the rectified voltage exceeds a predetermined value, a regulation circuit connected at the connection node of the first and second transistors, and circuitry for applying, to the second transistor, a turn-on pulse of determined duration after the output voltage of the bridge has exceeded the determined value.

5 Claims, 4 Drawing Sheets

HIGH AND LOW VOLTAGE D. C. POWER SUPPLY

BACKGROUND OF THE INVENTION

1. Field of the Invention

The present invention relates to a circuit adapted for providing, from a rectifying bridge, on the one hand, a D.C. power supply intended for supplying a load and, on the other hand, one or several low voltage power supplies for supplying secondary circuits such as control circuits.

The present invention especially aims at the supply of low power motors, that is, of a power smaller than 1 kilowatt, for example, motors which can be found in many industrial or household applications such as washing machines, vacuum cleaners, fans, etc. In such applications, two constraints are imposed. The first one is that the circuit must be of low cost, the second one being that the circuit sends back a minimum amount of electric noise onto the mains.

2. Discussion of the Related Art

The general architecture of a conventional motor control circuit is illustrated in FIG. 1. This circuit includes a rectifying bridge 1 connected across the mains via a filtering circuit 2. Between the positive and negative output terminals of the rectifying bridge is connected a capacitor of high value C intended for storing and smoothing the D.C. voltage to be supplied to a load. To control a reciprocating motor M, three bridge arms, each including two switches S1–S2, S3–S4, S5–S6 are, for example, provided. The opening and the closing of these switches to supply the inductive windings of the three-phase motor are determined by a control circuit including, on the one hand, adapter circuits 3, 4, 5 coupled to the pairs of switches, and on the other hand, a microcontroller µC intended for applying the control signals to the various adapter circuits. Adapter circuits of type L6386 and a microcontroller of type ST92141, both sold by STMicroelectronics, may, for example, be used.

Further, the circuit must include means for supplying power to the microcontroller, and possibly other elements of the circuit. For this purpose, a low voltage power supply circuit (LPS) 7 providing for example two D.C. voltages V1 and V2, of respective values 15 V and 5 V, is provided. Preferably, low voltage power supply circuit 7 is connected between the positive and negative terminals of the same rectifying bridge as that which supplies the main circuit. Further, a power factor (PF) improvement circuit 9 is generally provided across the rectifying bridge.

Conventional circuits seldom include all the elements described hereabove. In the more specific case of a circuit such as shown, it is difficult to design an association of a power factor improvement circuit and of a low voltage power supply circuit of low general cost. It should be recalled that the aim of power factor improvement circuit 9 essentially is to widen the current pulse which is extracted from the mains each time capacitor C is desired to be recharged, that is, upon each halfwave, to reduce the current harmonics sent back onto the mains, and thus to reduce the dimensions of the components (inductance and capacitance) of filter 2, which also helps to reduce costs. Indeed, presently, in practice, the sum of the costs of the low voltage power supply circuit and of the power factor reduction circuit assembly (if provided) and of the filter substantially amounts to half the cost of the entire circuit.

SUMMARY OF THE INVENTION

Thus, to reduce the costs of a power supply circuit of the described type, the present invention provides combining a low voltage power supply circuit and the power factor improvement circuit.

To achieve these and other objects, the present invention provides a circuit for providing a D.C. voltage of high value from the rectified output of a rectifying bridge on a capacitor of high capacitance, and for providing low supply voltages, including a first diode connected between the first output terminal of the rectifying bridge and a first terminal of the capacitor; first and second cascode-connected transistors, the first main terminal of the first transistor being connected to the first output terminal of the rectifying bridge, the second main terminal of the second transistor being connected to the second output terminal of the bridge; means for setting the potential of the control terminal of the first transistor to a first voltage with respect to the second terminal of the bridge; means for reducing the potential of the control terminal when the voltage on the first terminal exceeds a predetermined value; a regulation circuit connected at the connection node of the first and second transistors; a second diode connecting the connection node of the first and second transistors to the control terminal of the first transistor; and means for applying, to the second transistor, a turn-on pulse of determined duration after the output voltage of the bridge has exceeded the determined value.

According to an embodiment of the present invention, the first transistor is an insulated-gate bipolar transistor (IGBT).

According to an embodiment of the present invention, the second transistor is a MOS transistor.

According to an embodiment of the present invention, the control signals of the means for reducing the potential are provided by a microcontroller based on a detection of the output voltage of the rectifying bridge, of the output voltage of the first diode, and of the current in this first diode.

According to an embodiment of the present invention, the regulation circuit includes a third diode connected to the connection node of the first and second transistors and a capacitor connected between this diode and the low terminal of the rectified voltage.

The foregoing objects, features and advantages of the present invention, will be discussed in detail in the following non-limiting description of specific embodiments in connection with the accompanying drawings.

DETAILED DESCRIPTION

Figure 2:
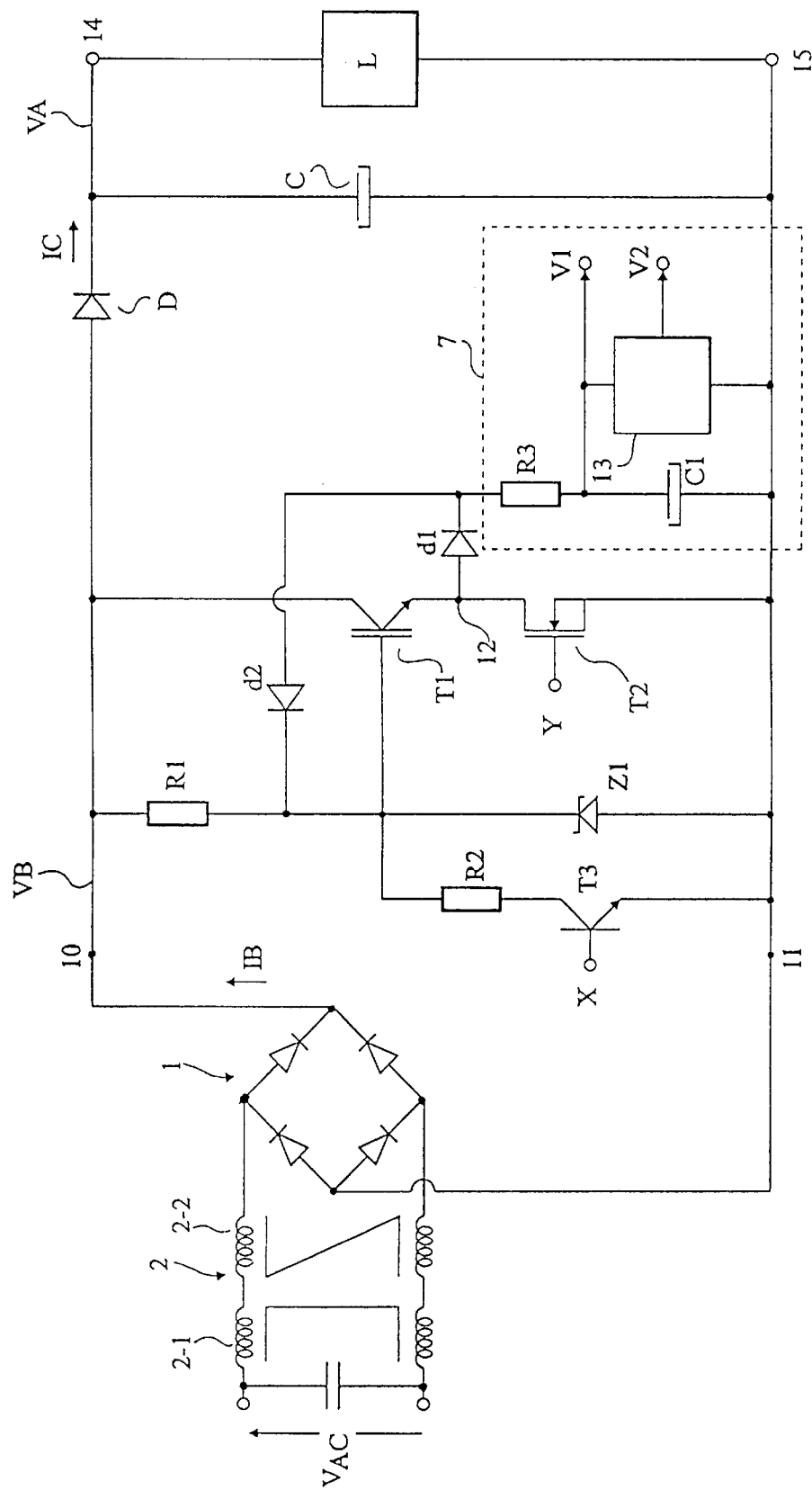
FIG. 2 schematically shows a simplified embodiment of a circuit according to the present invention.

As shown in FIG. 2, an embodiment of a circuit according to the present invention uses a rectifying bridge 1. The primary of the rectifying bridge is connected to A.C. power supply terminals VAC via a filter 2 which is comprised, for example, of a capacitor across the A.C. voltage and of inductances coupled to the input terminals of the rectifying bridge. A pair of inductances with a ferrite core 2-1 and a pair of inductances with an iron core 2-2 have been shown as an example. Inductances 2-2 are of high value and function to filter low-frequency components (frequencies under approximately 1 kHz). Inductances 2-1 with a ferrite core are intended for suppressing high-frequency components (frequencies greater than approximately 1 kHz) which, as will be seen hereafter, are not excessive during operation of the circuit according to the present invention in which the various control signals are sent only at the rate of the halfwaves of the A.C voltage.

The circuit according to the present invention includes, between positive and negative output terminals 10 and 11 of rectifying bridge 1, the cascode assembly of two transistors T1 and T2. Transistor T1 preferably is a voltage-controlled transistor. Further, since this transistor must, as will be seen hereafter, withstand a given reverse voltage without breaking down, an IGBT transistor will preferably be chosen rather than a conventional MOS transistor. Transistor T1 is sized to withstand the voltage between terminals 10 and 11, that is, a maximum voltage on the order of 300 volts when the A.C. input voltage, VAC, is the 220-volt mains voltage. Transistor T2 is a low power transistor, preferably a MOS transistor easily controllable by logic signals. The collector of transistor T1 is connected to terminal 10, the emitter of transistor T1 is connected to the drain of transistor T2, and the source of transistor T2 is connected to terminal 11. Transistor T2 receives, on its control terminal, a signal Y which will be described hereafter. The gate of transistor T1 is biased by a zener diode Z1. More specifically, this gate is connected, on the one hand, to terminal 10 by a resistor of high value R1, and, on the other hand, to terminal 11 by zener diode Z1. Further, the gate of transistor T1 is capable of being connected to terminal 11 via a switch in series with a resistor R2. In the embodiment shown, this switch is formed of a bipolar transistor T3, the collector of which is connected to resistor R2 and the emitter of which is connected to terminal 11. The base of transistor T3 is capable of receiving a signal X. Connection node 12 between transistors T1 and T2 is connected via a diode d1 to a low voltage power supply circuit 7. In the embodiment shown, the cathode of diode d1 is connected to terminal 11 via a resistor R3 and a capacitor C1. The connection node of resistor R3 with capacitor C1 forms a first output terminal at a first low voltage V1. Voltage V1 supplies a conventional regulation circuit 13 providing a second D.C. regulated voltage V2. It should be noted that voltage V1 is substantially equal to the zener voltage of diode Z 1 minus the gate-emitter voltage of transistor T1, minus the forward voltage drop of diode d1. Thus, if voltage V1 is desired to be on the order of 15 volts, the zener voltage of diode Z1 will be on the order of 18 volts. Voltage V2 will for example be equal to 5 volts. Regulation circuit 13 can, for example, be a circuit sold by STMicroelectronics under reference ST78L05A.

Further, the circuit includes between the cathode of diode d1 and the gate of transistor T1 a recirculation diode d2.

Figure 1:
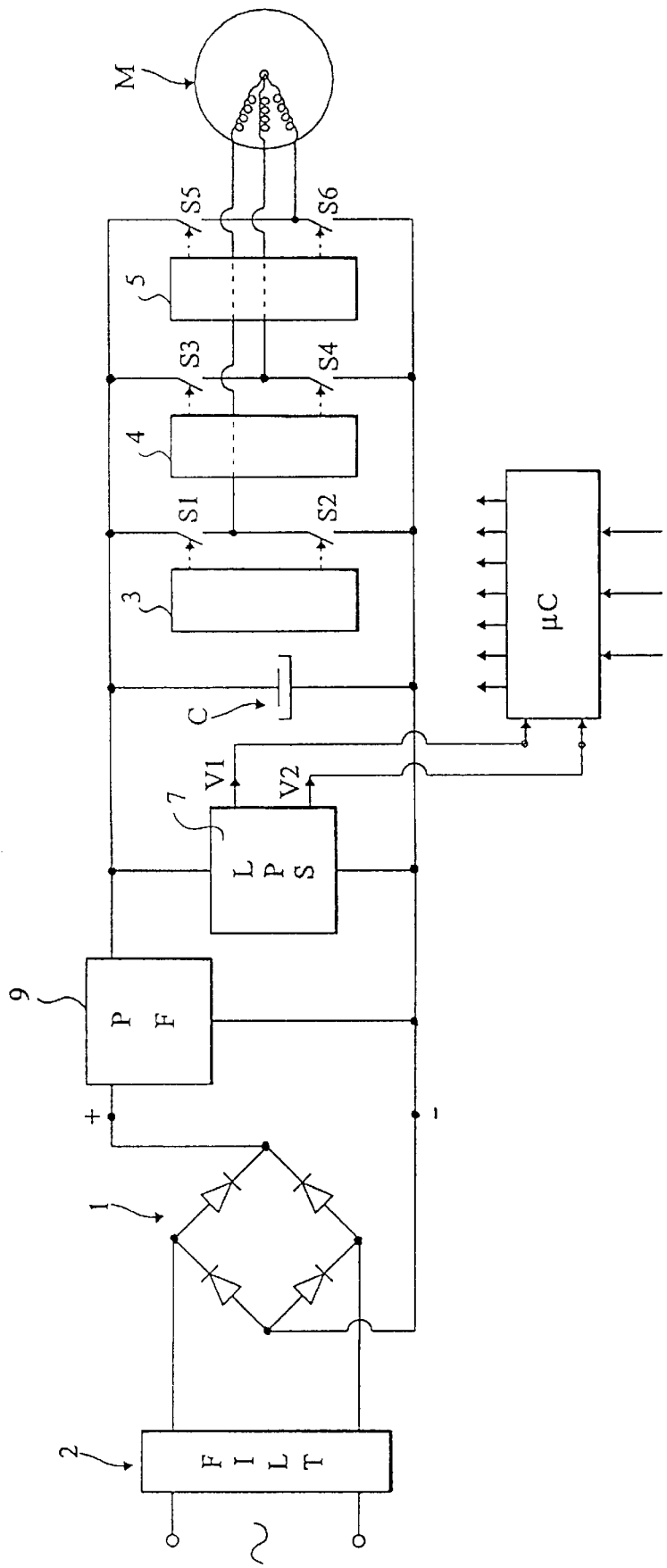
FIG. 1, previously described, shows the general architecture of a circuit of D.C. supply of a load and of provision of a low voltage.

Terminals 10 and 11 are respectively connected to output terminals 14 and 15, a diode D being inserted between terminals 10 and 14. In the example shown, terminals 11 and 15 are confounded. Between terminals 14 and 15 is arranged a capacitor of high value C intended for storing a D.C. voltage between recharge phases. A load L may be arranged between terminals 14 and 15 and for example corresponds to an assembly of six switches S1 to S6 supplying motor windings as described in relation with FIG. 1.

The operation of this circuit will be described in relation with FIG. 3. IB designates the output voltage of the rectifying bridge, VB designates the output voltage on terminal 10 of the rectifying bridge, IC designates the current flowing through diode D and flowing towards capacitor C and/or load L, and VA designates the voltage between output terminals 14 and 15.

Figure 3:
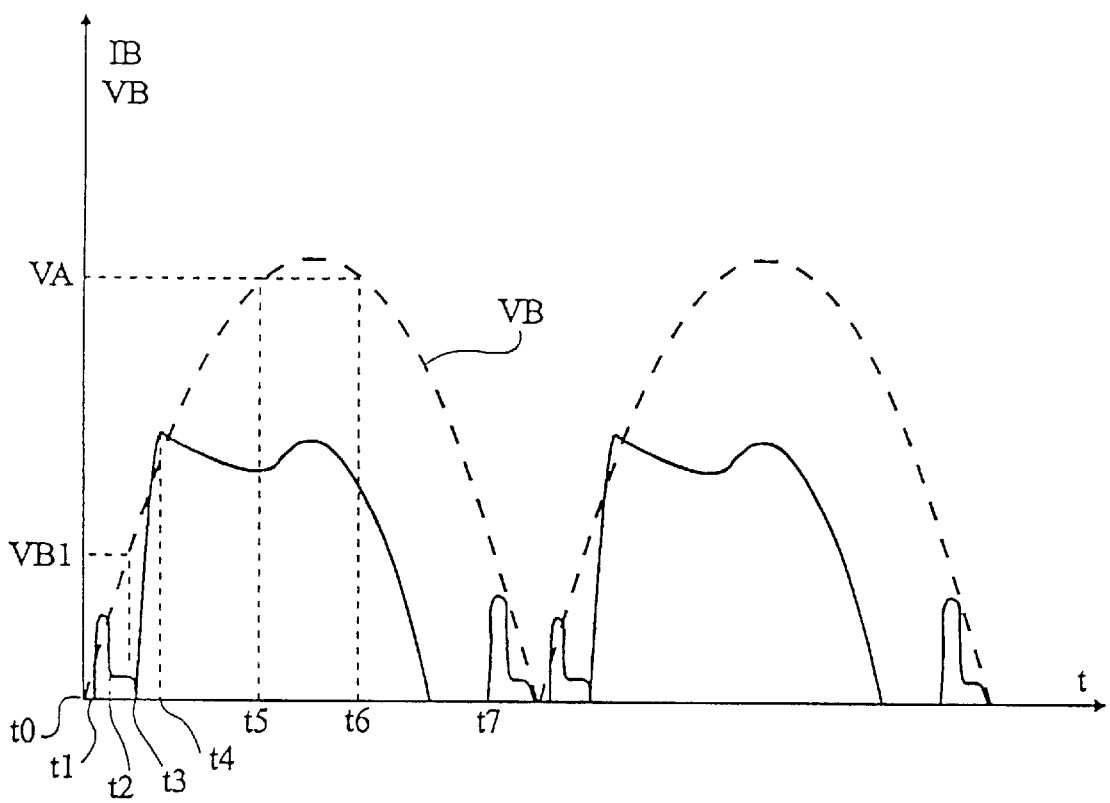
FIG. 3 shows voltage and current curves intended for illustrating the operation of the circuit according to the present invention.

FIG. 3 shows, in dotted lines, sinusoid arches corresponding to the general shape of voltage VB and, in full line, current IB drawn from the mains by rectifying bridge 1. It is assumed to be in a state where the circuit has already operated, that is, capacitor C is charged to a high voltage slightly lower than the peak value of voltage VB and capacitor C1 is charged to voltage V1. Thus, at time t0, voltage VB starts decreasing and no current flows.

At a time t1, as soon as voltage VB, which is applied on the gate of transistor T1, reaches a value sufficiently greater than the voltage on the emitter of this transistor [V1+(voltage drop in diode d1)+(gate-emitter voltage drop of transistor T1)], transistor T1 turns on. The gate voltage of this transistor then settles at a value slightly greater than this value of turning on by diode Z1. From time t1 on, a relatively high current flows through transistor T1, diode d1, and resistor R3 to recharge capacitor C1. Then, from time t2 on, this current settles at a smaller value corresponding to the power consumption on low voltage supply sources V1 and V2.

At a time t3, which corresponds to a chosen value VB1 of voltage VB, for example, substantially equal to 100 volts, the conduction of transistor T1 is interrupted by controlling with a signal X the turning-on of transistor T3. The gate of transistor T1 then discharges. However, the value of resistance R2, although smaller than resistance R1, is sufficiently high to have capacitor C1 only slightly discharge during a halfwave of the supply voltage. Thus, the gate voltage of transistor T1 remains substantially equal to the voltage on capacitor C1, that is, on the order of 15 volts in the preceding example.

Immediately after the turning-on of transistor T3, a voltage pulse Y is applied on the gate of transistor T2 to turn it on for a short time. Thus, the potential on the emitter of transistor T1 abruptly drops while its gate, biased by capacitor C1 through resistor R3 and diode d2, still is at a high level. Thus, transistor T1 turns back on. Starting from the time when transistor T1 turns back on, the current flows through transistors T1 and T2 as well as through inductances 2-1 and 2-2 and very rapidly increases until a time t4 which corresponds to the end of pulse Y applied to the gate of transistor T3. During this phase, it can be assumed that the mains voltage between terminals 10 and 11 is totally applied to inductances 2-1, 2-2 which store power.

At the end of pulse Y, at time t4, transistor T2 is off but, during a transient phase, transistor T1 remains on and the current through the inductances keeps on flowing between the A.C. supply terminals by flowing from terminal 10 to terminal 11 through transistor T1, diodes d1 and d2, and zener diode Z1. During this phase, the current progressively decreases in the channel of transistor T1 according to the closing rate of transistor T2 and then, as soon as voltage VB on terminal 10 exceeds the instantaneous value of voltage VA (time t5), diode D turns on and the current flow stops in transistor T1. The current provided by the rectifying bridge is then used to recharge capacitor C and to supply load L through diode D. The conduction continues until voltage VB clearly falls under the value of voltage VA, which occurs some time after time t6.

Then, current IB becomes zero until a time t7 at which signal X applied to the base of transistor T3 turns this transistor back off so that the voltage on the gate of transistor T1 rises back and a current flows again through this transistor to recharge capacitor C1. At the end of a halfwave, a new current flow cycle which has substantially the same outlook as that of the beginning of the conduction phase is thus obtained. It should however be noted that the current peak normally is slightly higher since the duration which has elapsed since the preceding recharge phase of capacitor C1 is longer than between time t7 and time t1 of the next halfwave.

Thus, according to the present invention, a flowing of current IB during relatively extensive phases of a halfwave of the mains voltage has been obtained. It should be noted that, in the absence of the circuit according to the present invention, there would have been a flowing of current IB substantially only during phase t5–t6 when the mains voltage becomes greater than the voltage across capacitor C.

Signal X can be obtained in an analog way, for example, by connecting the base of transistor T3 to terminal 10 via a resistor and by connecting this base to terminal 11 via a zener diode having, for example, a zener voltage on the order of some hundred volts. Thus, the current consumption in the low voltage power supply circuit is interrupted as soon as the mains voltage exceeds some hundred volts. Control pulse Y can be automatically provided by detecting the turning-on of transistor T3, and then by controlling for a determined duration the conduction of transistor T2 by various known means. However, according to the present invention, advantage will preferably taken from the fact that the envisaged applications are applications in which a microcontroller is provided, as described in relation with FIG. 1, and this microcontroller will be used to generate signals X and Y. It should be noted that the duration of conduction of transistor T2 enables ensuring a regulation of voltage VA and also ensuring an optimization of the shape of the current extracted between times t3 and t6, and especially of the minimum value of this current, at time t5.

Figure 4:
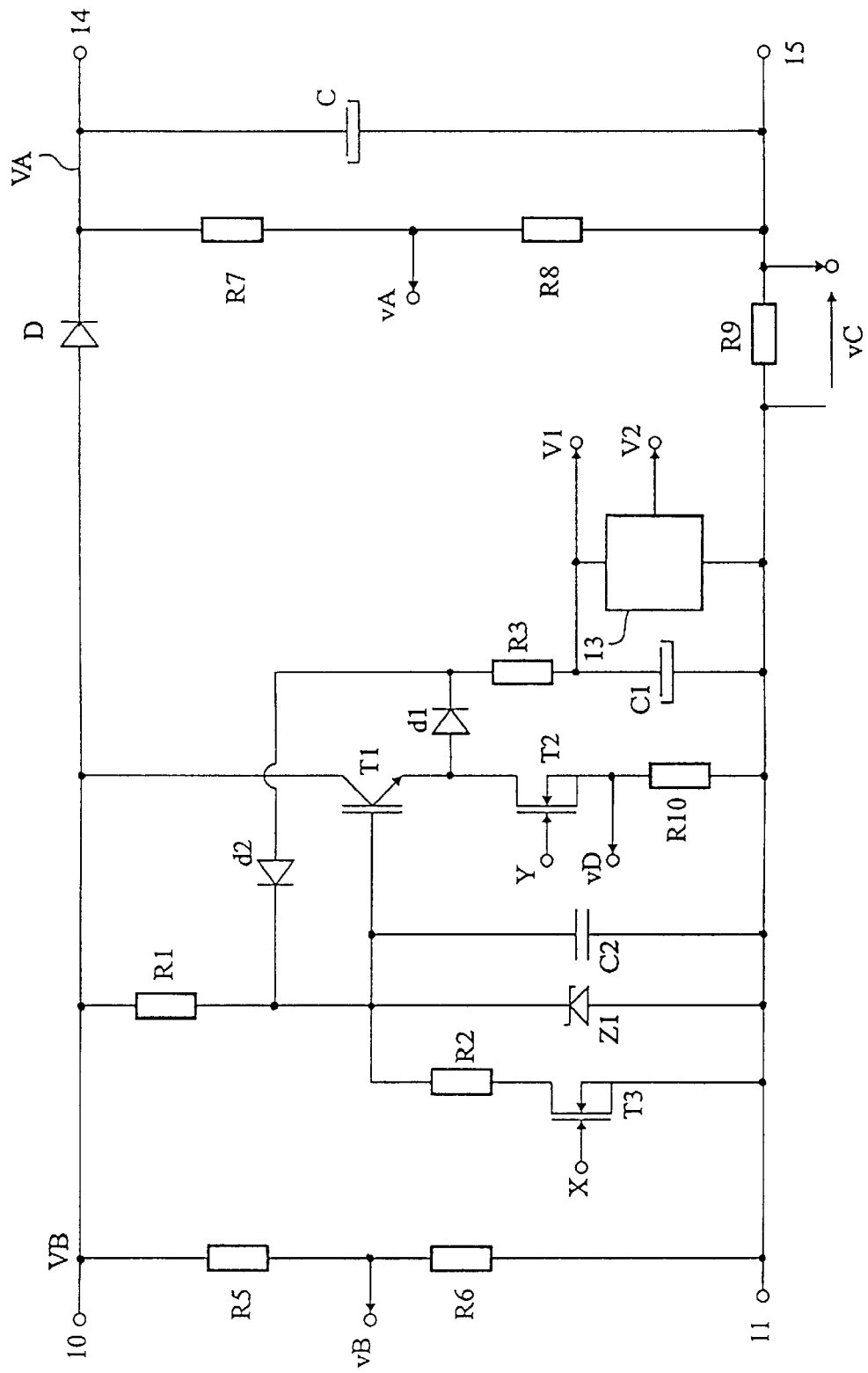
FIG. 4 is a more detailed representation of an embodiment of the circuit according to the present invention.

FIG. 4 shows a rather more detailed embodiment of the circuit of FIG. 2 especially indicating a way of extracting the signals required to control the microprocessor. In FIG. 4, the output voltage of the rectifying bridge appears on terminals 10 and 11 and the voltage across the load appears between terminals 14 and 15. In this drawing, the same references as in FIG. 2 designate same elements. Transistor T3 has been shown as an alternative in the form of a MOS transistor, and this does not change the circuit operation. A capacitor C2 has been arranged in parallel on diode Z1 and is reduces or prevents voltage oscillations on the gate of transistor T1.

A dividing bridge including resistors R5 and R6 is connected between terminals 10 and 11 to provide a voltage vB which forms an image of voltage VB. A dividing bridge including resistors R7 and R8 is connected between terminals 14 and 15 to provide a voltage vA which is an image of voltage VA. Further, a small resistor R9 is connected in series with the main supply circuit so that voltage vC thereacross is an image of charge current IC, which corresponds to the current flowing through diode D. Finally, a resistor of low value R10 connected in series with transistors T1 and T2 so that voltage vD thereacross is an image of the current in the main transistor chain may be provided. This last information may be used as a security to turn off transistor T2 if the current becomes too high during phase t3–t4. Based on the information provided by voltages vA, vB, vC, vD, it will be possible to provide rectangular pulses X and Y. Signal X will be at zero as long as voltage VB will be under a determined threshold. The duration of rectangular pulse Y will be determined so that VA remains smaller by a determined value than the peak value of VB and so that the current decrease at time t5 is optimized. These two settings will be easily performed by appropriately programming the control microcontroller.

Among the advantages of the circuit according to the present invention, it should be noted that the power dissipated by the circuit for supplying low supply voltages V1 and V2 is minimum since this circuit only consumes power if the power is effectively extracted from low voltage sources V1 and V2. Further, the recharge of these circuits is provided only while the mains voltage is relatively low (under a reference value, for example, equal to 100 volts). Another advantage of the circuit according to the present invention is that it uses at no time components operating at high frequency. The highest control frequency among the frequencies applied is double the mains frequency, that is, 100 or 120 Hz in the case of the two most current standardized systems.

Another advantage of the present invention is that the power stage of the voltage regulator and of the harmonics corrector is common to both, which reduces the system cost.

As a numerical example, the following values may be provided for the various components illustrated in FIG. 4:

R1: 470 k$\omega$

R2: 10 k$\omega$

R3: a few ohms

R5: 1 M$\omega$

R6: 12 k$\omega$

R7: 1 M$\omega$

R8: 12 k$\omega$

R9: 1 $\omega$

R10: 1 $\omega$

Z1: zener voltage 18 volts

C: 220 $\mu$F/400 V

C1: 470 $\mu$F/25 V

C2: 10 nF/50 V.

Of course, the present invention is likely to have various alterations, modifications, and improvements which will readily occur to those skilled in the art, and also applies to circuits of doubler type.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A circuit for providing a D.C. voltage of high value from the rectified output of a rectifying bridge on a capacitor of high capacitance, and for providing low supply voltages, including:

a first diode connected between the first output terminal of the rectifying bridge and a first terminal of the capacitor, first and second cascode-connected transistors, the first main terminal of the first transistor being connected to the first output terminal of the rectifying bridge, the second main terminal of the second transistor being connected to the second output terminal of the bridge, means for setting the potential of the control terminal of the first transistor to a first voltage with respect to the second terminal of the bridge, means for reducing the potential of the control terminal when the voltage on the first terminal exceeds a predetermined value, a regulation circuit connected at the connection node of the first and second transistors, a second diode connecting the connection node of the first and second transistors to the control terminal of the first transistor, and a means for applying, to the second transistor, a turn-on pulse of determined duration after the output voltage of the bridge has exceeded the determined value.

2. The circuit of claim 1, wherein the first transistor is an insulated-gate bipolar transistor.

3. The circuit of claim 1, wherein the second transistor is a MOS transistor.

4. The circuit of claim 1, wherein the control signals of the means for reducing the potential are provided by a microcontroller based on a detection of the output voltage of the rectifying bridge, of the output voltage of the first diode, and of the current in this first diode.

5. The circuit of claim 1, wherein the regulation circuit includes a third diode connected to the connection node of the first and second transistors and a capacitor connected between this diode and the low terminal of the rectified voltage.

* * * * *